(12) United States Patent
Kurogi

(10) Patent No.: US 11,968,917 B2
(45) Date of Patent: Apr. 30, 2024

(54) WORKING VEHICLE AND WORKING MACHINE HAVING THE WORKING VEHICLE

(71) Applicant: KUBOTA CORPORATION, Osaka (JP)

(72) Inventor: Toshiaki Kurogi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 386 days.

(21) Appl. No.: 17/350,629

(22) Filed: Jun. 17, 2021

(65) Prior Publication Data

US 2021/0307231 A1 Oct. 7, 2021

Related U.S. Application Data

(63) Continuation of application No. PCT/JP2019/049845, filed on Dec. 19, 2019.

(30) Foreign Application Priority Data

Dec. 26, 2018 (JP) .................................. 2018-243531

(51) Int. Cl.
*A01B 69/04* (2006.01)
*A01B 69/00* (2006.01)
*A01B 69/08* (2006.01)

(52) U.S. Cl.
CPC .......... *A01B 69/008* (2013.01); *A01B 69/004* (2013.01); *A01B 69/006* (2013.01)

(58) Field of Classification Search
CPC .......... G05D 2201/0213; B60W 50/14; B60W 10/20; B60W 2540/18; B60W 2556/50; B60W 2710/20; B60W 2710/207; B60W 30/045; B60W 40/072; B60W 2300/152; B60W 2300/145; A01B 69/008;
(Continued)

(56) References Cited

U.S. PATENT DOCUMENTS 9,238,483 B2 * 1/2016 Hafner .................. B60W 10/20
2006/0142936 A1 * 6/2006 Dix ....................... G01C 21/005
701/41
(Continued)

FOREIGN PATENT DOCUMENTS

EP 3 351 077 A1 7/2018
JP 58-56606 A 4/1983
(Continued)

OTHER PUBLICATIONS

Official Communication issued in corresponding European Patent Application No. 19901805.2, mailed on Aug. 26, 2022.
(Continued)

*Primary Examiner* — Khoi H Tran
*Assistant Examiner* — Nhi Q Bui
(74) *Attorney, Agent, or Firm* — Keating & Bennett, LLP

(57) ABSTRACT

A working vehicle includes a traveling vehicle to travel on a scheduled traveling route and including a connector to which a towed vehicle is connected, and an autonomous traveling controller to control autonomous traveling of the traveling vehicle based on the scheduled traveling route and a relative angle between the connector of the traveling vehicle and the towed vehicle connected to the connector.

7 Claims, 20 Drawing Sheets

(58) Field of Classification Search
CPC ... A01B 69/004; A01B 69/007; A01B 69/001; A01B 69/006
See application file for complete search history.

(56) References Cited

U.S. PATENT DOCUMENTS

| | | |
|---|---|---|
| 2014/0052337 A1* | 2/2014 | Lavoie ................... B62D 13/06 701/41 |
| 2015/0342110 A1* | 12/2015 | Peake ................. G05D 1/0212 701/50 |
| 2016/0229451 A1* | 8/2016 | Raad .................... B62D 15/027 |
| 2017/0188505 A1 | 7/2017 | Potier et al. |
| 2018/0127024 A1* | 5/2018 | Pourrezaei Khaligh ..................... B60D 1/246 |
| 2019/0092388 A1* | 3/2019 | Raad ..................... B62D 13/06 |

FOREIGN PATENT DOCUMENTS

| | | |
|---|---|---|
| JP | 62-289472 A | 12/1987 |
| JP | 01-223084 A | 9/1989 |
| JP | 2006-180702 A | 7/2006 |
| JP | 2018-116608 A | 7/2018 |
| JP | 2018-180919 A | 11/2018 |

OTHER PUBLICATIONS

Official Communication issued in International Patent Application No. PCT/JP2019/049845, mailed on Mar. 17, 2020.

\* cited by examiner

WORKING VEHICLE AND WORKING MACHINE HAVING THE WORKING VEHICLE

CROSS REFERENCE TO RELATED APPLICATIONS

This application is a continuation application of International Application No. PCT/JP2019/049845, filed on Dec. 19, 2019, which claims the benefit of priority to Japanese Patent Application No. 2018-243531, filed on Dec. 26, 2018. The entire contents of each of these applications are hereby incorporated herein by reference.

BACKGROUND OF THE INVENTION

1. Field of the Invention

The present invention relates to a working vehicle such as a tractor and to a working machine including the working vehicle, for example.

2. Description of the Related Art

A technique disclosed in Japanese Unexamined Patent Application Publication No. 2018-116608 is known as a technique for creating a traveling route (a scheduled traveling route) on which a working vehicle such as a tractor autonomously travels. In Japanese Unexamined Patent Application Publication No. 2018-116608, a traveling route creating unit generates an inner traveling route constituted of straight traveling routes and a U-turn route connecting the straight traveling routes, and a circuit traveling route for traveling around in an outer circumferential area of an agricultural field.

SUMMARY OF THE INVENTION

A working vehicle includes a traveling vehicle to travel on a scheduled traveling route and including a connector to which a towed vehicle is connected, and an autonomous traveling controller configured or programmed to control autonomous traveling of the traveling vehicle based on the scheduled traveling route and a relative angle between the connector of the traveling vehicle and the towed vehicle connected to the connector.

The autonomous traveling controller is configured or programmed to control steering of the traveling vehicle so that a vehicle position of the traveling vehicle matches the scheduled traveling route.

The autonomous traveling controller is configured or programmed to determine at least one of a steering angle and a steering direction based on the relative angle.

When the scheduled traveling route includes a turn portion to cause the traveling vehicle moving thereon to turn, and the relative angle is less than a turn judgment value, the autonomous traveling controller is configured or programmed to execute a turn control to determine the steering angle and the steering direction so that the vehicle position of the traveling vehicle matches the turn portion. In the turn control, when the relative angle becomes the turn judgment value or more, the autonomous traveling controller is configured or programmed to stop the turn control.

After the stopping of the turn control, when the scheduled traveling route includes a straight-line portion continuously connected to the turn portion, the straight-line portion causing the traveling vehicle moving thereon to travel straight, the autonomous traveling controller is configured or programmed to shift to a multi-point turn control to turn the traveling vehicle in multiple points by changing either the steering angle or the steering direction so that the traveling vehicle enters the straight-line portion.

After the turn control or the multi-point turn control, the autonomous traveling controller is configured or programmed to determine the steering angle and the steering direction so that the towed vehicle is positioned on the straight-line portion.

A working machine includes the working vehicle mentioned above, a towed vehicle connected to the working vehicle, and an angle detector to detect the relative angle.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
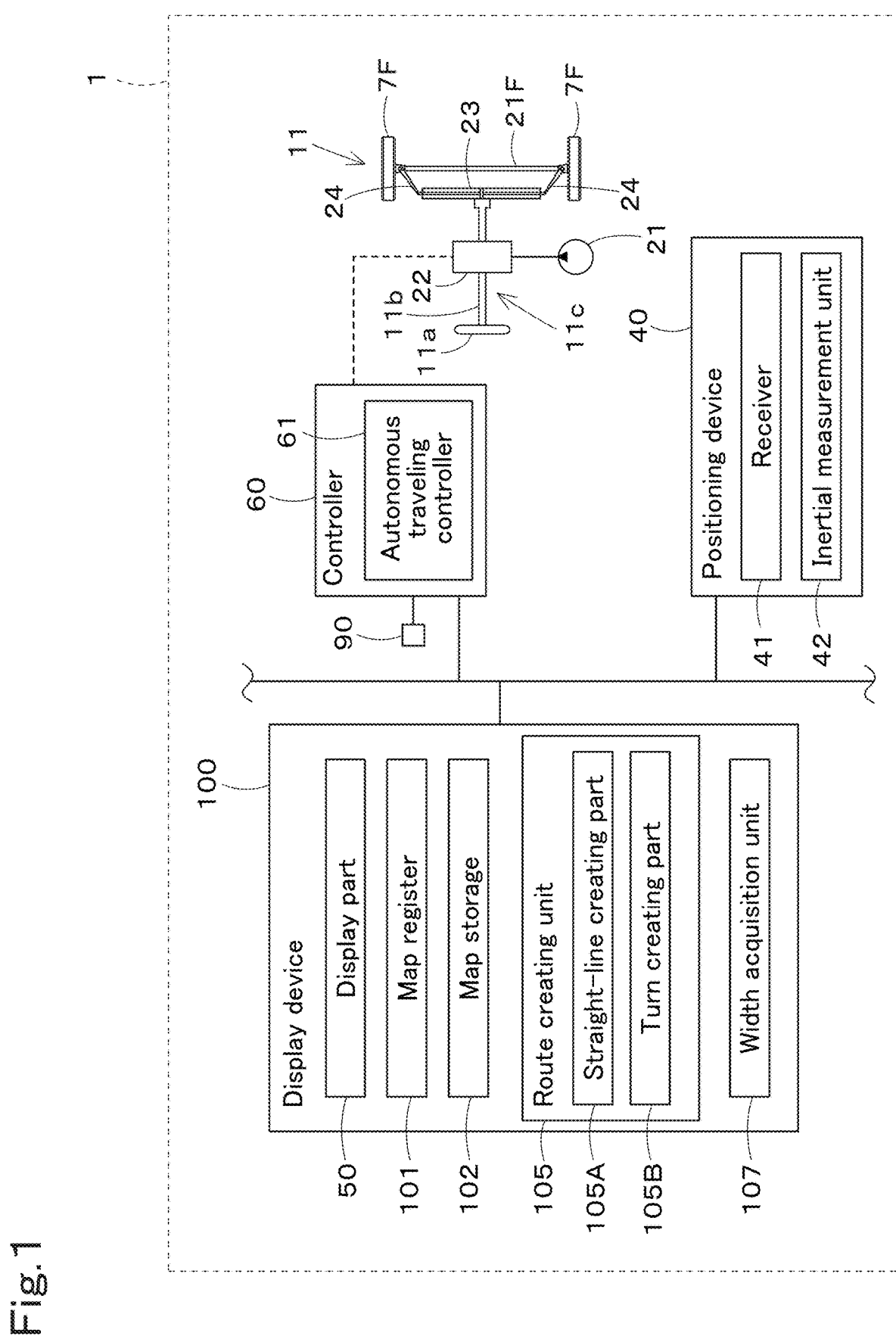
FIG. 1 is a view showing a block diagram of a working vehicle including a traveling support device.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

FIG. 1 shows a block diagram of a working machine. In the present preferred embodiment, the working machine includes a working vehicle 1 and a towed vehicle 2. The working vehicle 1 is a tractor configured to tow the towed vehicle 2, for example.

The tractor, one of the working vehicles, will be described.

Figure 14:
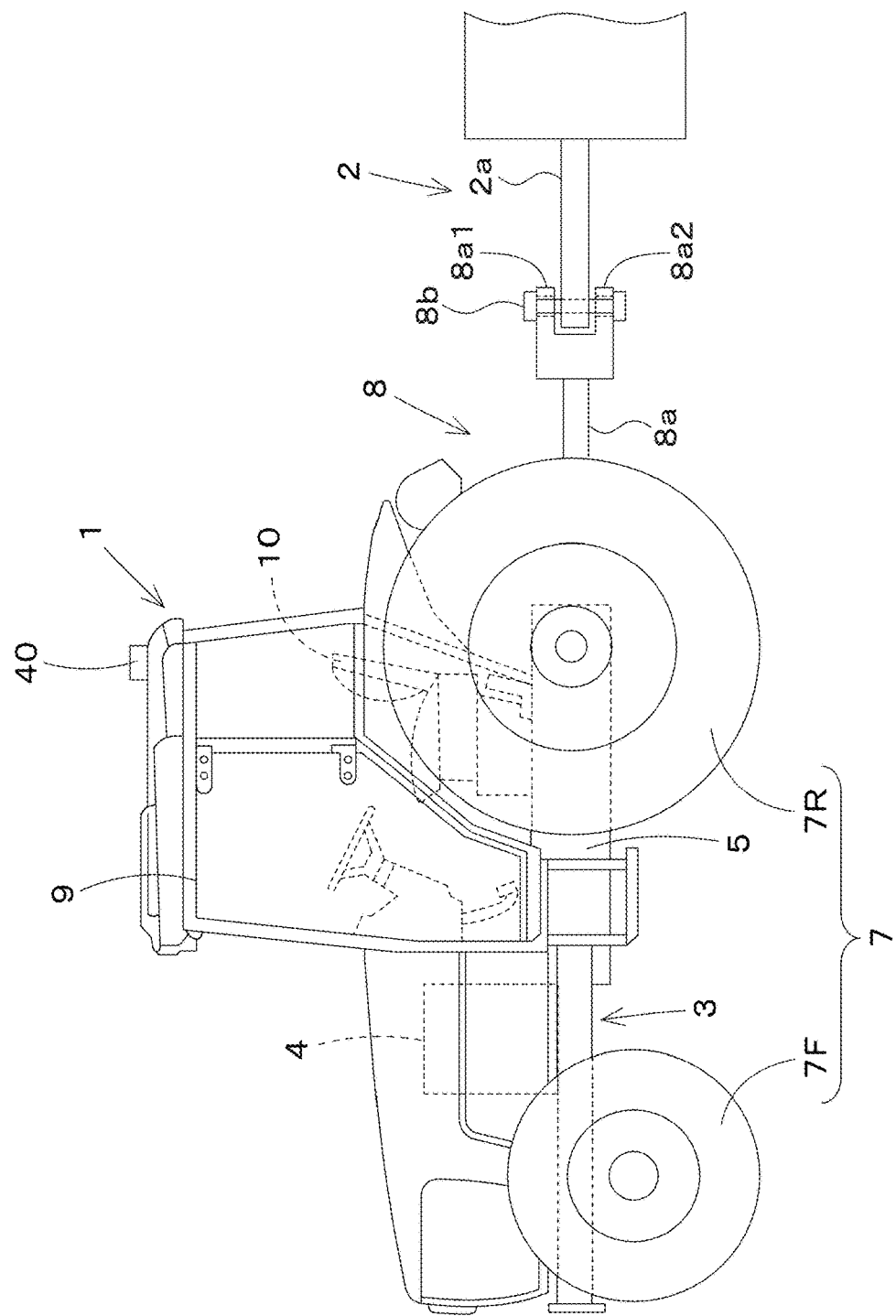
FIG. 14 is a side overall view of a tractor.

As shown in FIG. 14, the tractor 1 includes a traveling vehicle 3 including a traveling device 7, a prime mover 4, and a transmission device 5. The traveling device 7 includes front wheels 7F and rear wheels 7R. Each of the front wheels 7F may be of a tire type or crawler type. Each of the rear wheels 7R may also be of the tire type or crawler type. The prime mover 4 is a diesel engine, an electric motor, or the like. The transmission device 5 is configured to switch a propulsion force of the traveling device 7 by shifting gears, and also to switch a traveling direction of the traveling device 7 between forward and backward. A cabin 9 is mounted on the traveling vehicle 3, and a driver seat 10 is provided in the cabin 9.

A connector 8 to be connected to the towed vehicle 2 is provided in a rear portion of the traveling vehicle 3. By connecting the towed vehicle 2 to the connector 8, the traveling vehicle 3 can tow the towed vehicle 2. The towed vehicle 2 is a trailer or the like. The towed vehicle 2 includes a connecting bar 2a fixed to a frame of the towed vehicle 2 with fasteners such as bolts, and is not able to swing in a width direction. The connecting bar 2a may be fixed to the frame of the towed vehicle 2 by welding, for example. An insertion hole 2c is located in a front end of the connecting bar 2a.

Figure 2:
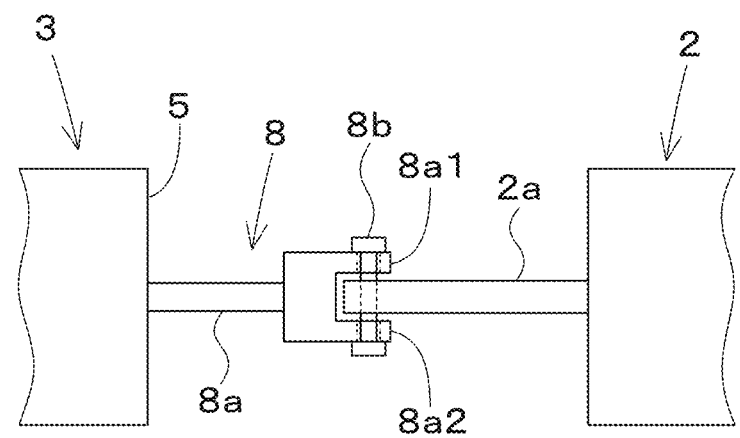
FIG. 2 is a view showing a connector.
Figure 2:
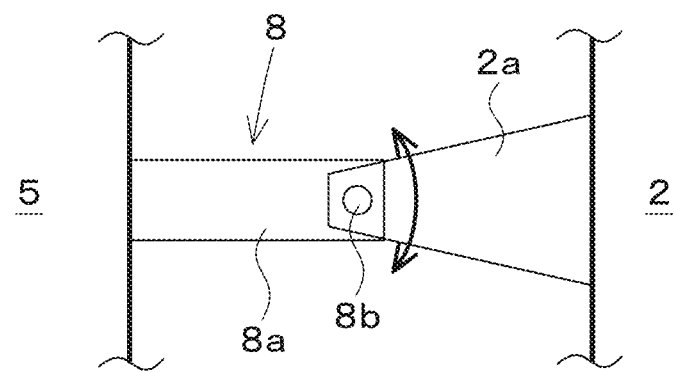

As shown in FIG. 2, the connector 8 is, for example, a towing hitch, and includes an extension member 8a extending rearwardly from the traveling vehicle 3, and a pivot pin 8b located at a rear end of the extension member 8a. A front portion of the extension member 8a is fixed to a transmission case, a differential case, or the like of the transmission device 5 with fasteners such as bolts, and is not able to swing in a width direction. A rear portion of the extension member 8a includes an upper wall 8a1 and a lower wall 8a2 separated from the upper wall 8a1, and the pivot pin 8b penetrates through the upper wall 8a1 and the lower wall 8a2. By positioning the connecting bar 2a of the towed vehicle 2 between the upper wall 8a1 and the lower wall 8a2 and inserting the pivot pin 8b into an insertion hole of the connecting bar 2a, the towed vehicle 2 can be connected to the connector 8.

As shown in FIG. 1, the tractor 1 includes a steering device 11. The steering device 11 includes a handling wheel (that is, a steering wheel) 11a, a rotation shaft (that is, a steering shaft) 11b that rotates with the rotating of the steering wheel 11a, and an assist mechanism (that is, a power steering mechanism) 11c that assists the steering of the steering wheel 11a. The auxiliary mechanism 11c includes a hydraulic pump 21, a control valve 22 to which hydraulic fluid output from the hydraulic pump 21 is supplied, and a steering cylinder 23 to be operated by the control valve 22. The control valve 22 is a solenoid valve configured to be operated according to a control signal. For example, the control valve 22 is a three-position switching valve configured to be switched through movement of a spool or the like. The control valve 22 can also be switched through the steering of the steering shaft 11b. The steering cylinder 23 is connected to an arm (that is, a knuckle arm) 24 that changes orientations of the front wheels 7F.

Thus, when the steering wheel 11a is operated, a switching position and an opening aperture of the control valve 22 are switched according to the operation of the steering wheel 11a, and the steering cylinder 23 is extended and contracted rightward or leftward according to the switching position and the opening aperture of the control valve 22, thus changing the steering directions of the front wheels 7F. The above-mentioned configuration of the steering device 11 is just an example, and a configuration of the steering device 11 is not limited to the above-mentioned configuration.

The tractor 1 includes a positioning device 40. The positioning device 40 is configured to detect its own position (that is, positioning information including latitude and longitude) with satellite positioning systems (that is, positioning satellites) such as D-GPS, GPS, GLONASS, HOKUTO, GALILEO, and MICHIBIKI. That is, the positioning device 40 receives satellite signals (that is, positions of the positioning satellites, transmission times, correction information, and the like) transmitted from the positioning satellites, and detects a position of the tractor 1 (for example, latitude, longitude), that is, detects a vehicle position, based on the satellite signals. The positioning device 40 includes a receiver 41 and an inertial measurement unit (IMU) 42. The receiver 41 includes an antenna and the like to receive satellite signals transmitted from the positioning satellites, and is attached to the traveling vehicle 3 separately from the inertial measurement unit 42. In the present preferred embodiment, the receiver 41 is attached to the traveling vehicle 3, that is, the cabin 9. The attachment location of the receiver 41 is not limited to that of the present preferred embodiment.

The inertial measurement unit 42 includes an acceleration sensor to detect acceleration, a gyro sensor to detect angular velocity, and the like. The inertial measurement unit 42 is located below the traveling vehicle 3, for example, below the driver seat 10, and can detect a roll angle, a pitch angle, a yaw angle, and the like of the traveling vehicle 3.

As shown in FIG. 1, the tractor 1 includes a controller 60. The controller 60 is configured or programmed to control a traveling system and a work system of the tractor 1.

The controller 60 is configured or programmed to include an autonomous traveling controller 61 to control autonomous traveling of the tractor 1. The autonomous traveling controller 61 includes electrical and electronic circuits provided in the controller 60, computer programs stored in a CPU, or the like. When autonomous traveling starts, the autonomous traveling controller 61 controls the control valve 22 of the steering device 11 so that the traveling vehicle 3 travels on the scheduled traveling route L1. In addition, when autonomous traveling starts, the autonomous traveling controller 61 controls a vehicle speed (that is, a velocity) of the tractor 1 by automatically gear-shifting the transmission device, changing a revolving speed of the prime mover, and the like.

Figure 3:
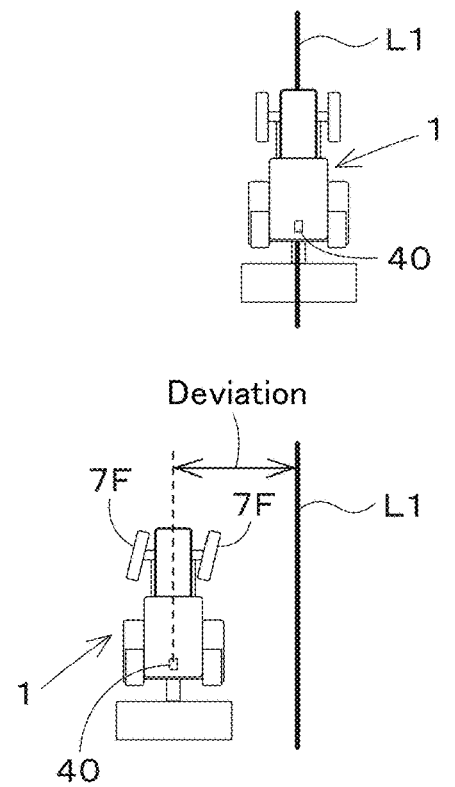
FIG. 3 is a view explaining autonomous traveling.
Figure 3:
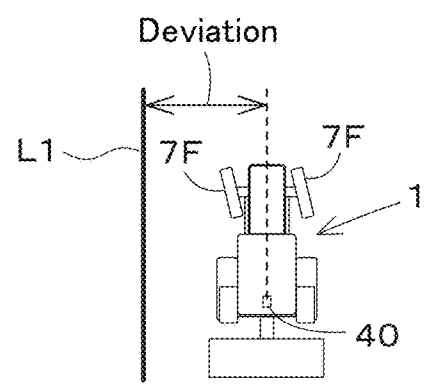
Figure 3:
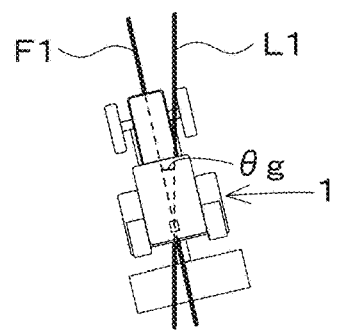

As shown in FIG. 3, when a deviation between a vehicle position and the scheduled traveling route L1 is less than a threshold value in autonomous traveling by the tractor 1, the autonomous traveling controller 61 maintains a rotation angle of the steering shaft (that is, a rotation shaft) 11b. When the deviation between the vehicle position and the scheduled travel route L1 is the threshold value or more and the tractor 1 is located leftward from the scheduled travel route L1, the autonomous traveling controller 61 rotates the steering shaft 11b so that a steering direction of the tractor 1 is orientated to the right. When the deviation between the vehicle position and the scheduled travel route L1 is the threshold value or more and the tractor 1 is located rightward from the scheduled travel route L1, the autonomous traveling controller 61 rotates the steering shaft 11b so that a steering direction of the tractor 1 is orientated to the left. In the above-mentioned preferred embodiment, a steering angle of the steering device 11 is changed based on the deviation between the vehicle position and the scheduled traveling route L1. However, when the direction of the scheduled traveling route L1 differs from a direction (referred to as a vehicle direction) F1 of a movement direction (referred to as a traveling direction) of the tractor 1 (that is, the traveling vehicle 3), that is, when an angle θg of the vehicle direction F1 relative to the scheduled traveling route L1 is a threshold value or more, the autonomous traveling controller 61 may set a steering angle so that the angle θg is zero (that is, the vehicle direction F1 matches a direction of the scheduled traveling route L1). The autonomous traveling controller 61 may also determine a final steering angle in autonomous steering according to a steering angle obtained based on the deviation (that is, a positional deviation) and a steering angle obtained based on the direction (that is, a directional deviation). The setting of the steering angle in autonomous steering in the above-mentioned preferred embodiment is just an example and is not limited thereto.

As described above, the controller 60 is capable of controlling the tractor 1 (that is, the traveling vehicle 3) to autonomously travel.

The tractor 1 includes a traveling support device 100. The traveling support device 100 is a display device installed near the driver seat 10. The following description assumes that the traveling support device 100 is a display device.

The display device includes a display 50 that may be any of a liquid crystal panel, a touch panel, or other panels, and is capable of displaying various information relating to the tractor 1, in addition to information for supporting the traveling of the tractor 1.

The display device includes a map register 101 and a map storage 102. The map register 101 includes electrical and electronic components mounted in the display device, a computer program installed in the display device, and other components. The map storage 102 may be non-volatile memory, or the like. The map register 101 registers a contour of a predetermined agricultural field, for example, a position corresponding to a contour of a predetermined agricultural field.

Figure 4:
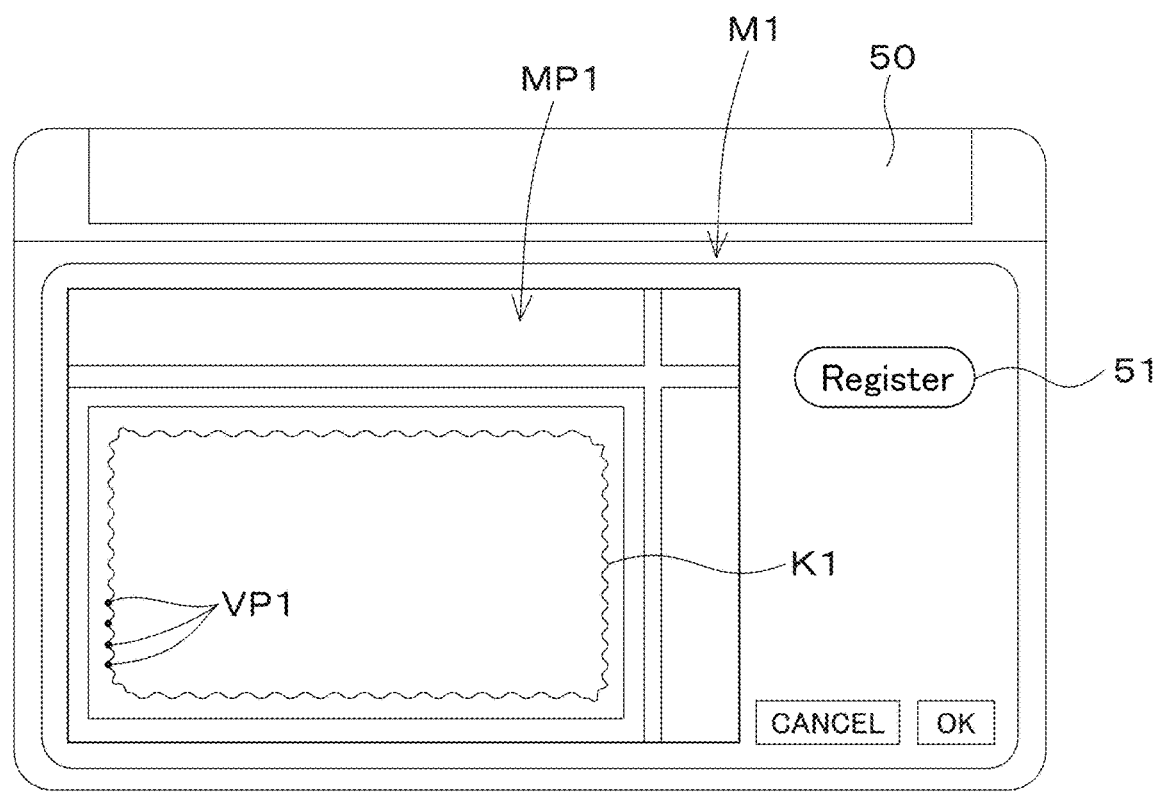
FIG. 4 is a view showing an example of a map register screen M1.
Figure 5A:
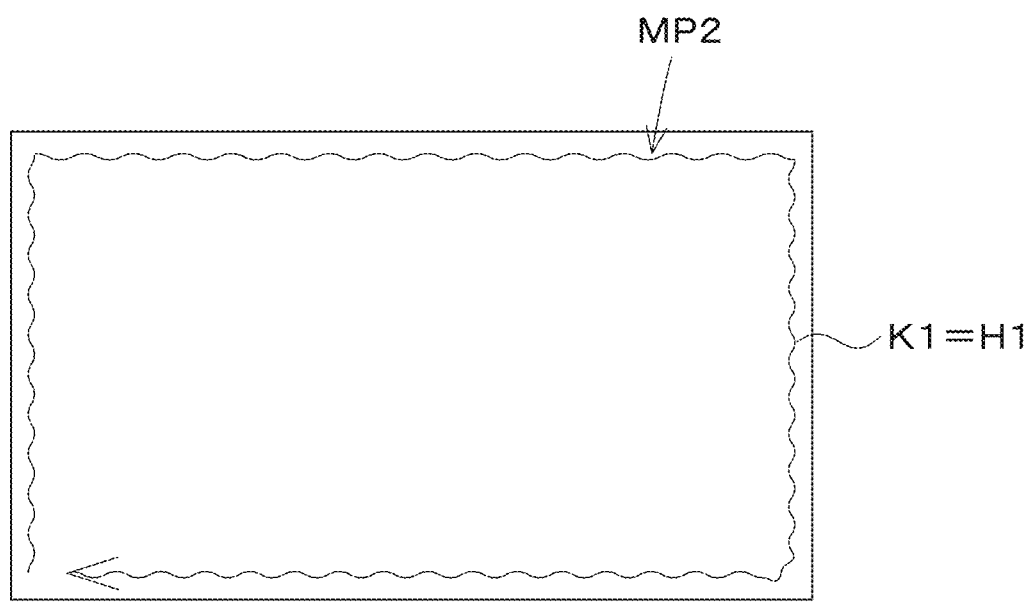
FIG. 5A is a view of acquiring a contour H1 of an agricultural field (a field map MP2) based on a traveling locus K1.

As shown in FIG. 4, when an operator (that is, a driver) performs a predetermined operation on the display device, the map register 101 displays a map register screen M1 on the display 50 of the display device. In the map register screen M1, a map MP1 including a map of a field, a vehicle position VP1 of the tractor 1, and field identification information such as a field name and a field management number are displayed. In addition to the image data showing the field, position information such as latitude and longitude is associated with the map MP1. When the tractor 1 enters the field and travels around in the field, the map register screen M1 displays the current vehicle position VP1 that is detected by the positioning device 40 during the traveling of the tractor 1 in the field. When the tractor 1 stops traveling around in the field and a registration button 51 displayed on the map register screen M1 is selected, the map register 101 uses, as a contour (that is, an outline) H1 of field, a traveling locus K1 obtained based on a plurality of vehicle positions obtained during the traveling of the tractor 1 as shown in FIG. 5A, and registers the field map MP2 represented by the contour H1 together with the field identification information.

Figure 5B:
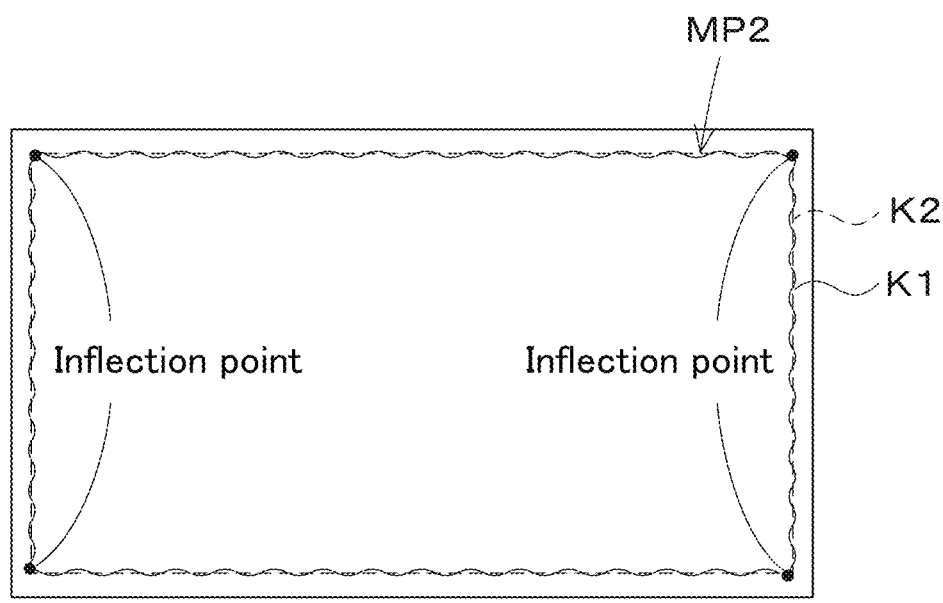
FIG. 5B is a view of acquiring the contour H1 of the agricultural field (the field map MP2) based on an inflection point of the traveling locus K1.
Figure 5C:
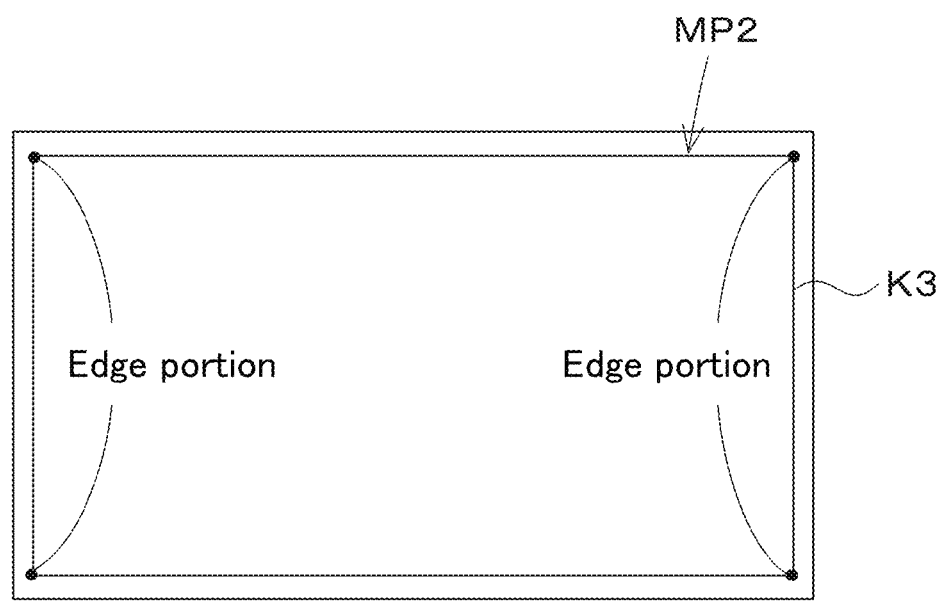
FIG. 5C is a view of acquiring the contour H1 (the field map MP2) based on switching operations in traveling.

As shown in FIG. 5B, the map register 101 may calculate inflection points based on the traveling locus represented by the vehicle position VP1 and register a contour K2 connecting the inflection points to one another as the contour H1 of field (that is, the field map MP2). As shown in FIG. 5C, a driver or another person may select edge portions of the field with use of a switch or the like provided on the tractor 1 traveling around, and the contour K3 connecting the selected edge portions to one another may be registered as the contour H1 (that is, the field map MP2). The above-mentioned method of registering a field is just an example and is not limited thereto. The contour of field, that is, the field map MP2, may be data indicated in positions (that is, latitude and longitude), data indicated in a coordinate system (that is, X-axis and Y-axis), or data in other expressions.

The map storage 102 stores the field map MP2 showing a contour (that is, an outline) registered by the map register 101. That is, the map storage 102 stores the field map MP2, i.e., data indicating the contour of field (that is, data for representing a predetermined field).

The display device (that is, the traveling support device 100) is configured to create, for a predetermined field, the scheduled traveling route L1 to be used in autonomously traveling the tractor 1. The traveling support device 100 includes a route creating unit 105 to create the scheduled traveling route L1 and a width acquisition unit 107. The route creating unit 105 and the width acquisition unit 107 include electrical and electronic circuits provided in the display device, computer programs stored in the display device, or the like.

Figure 6:
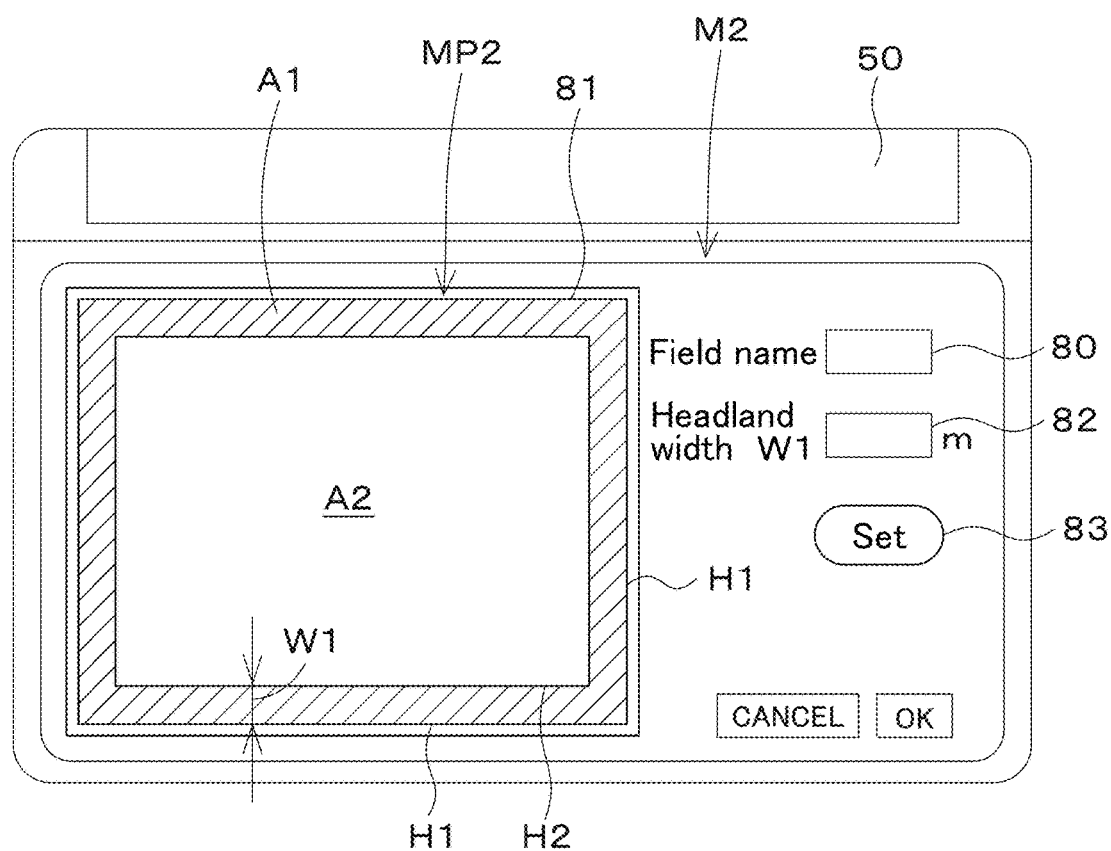
FIG. 6 is a view showing an example of a work setting screen M2.

As shown in FIG. 6, when an operator (that is, a driver) performs a predetermined operation on the display device, the route creating unit 105 displays the work setting screen M2. The work setting screen M2 includes a field input portion 80 and a field display portion 81. The field input portion 80 allows input of field identification information such as a field name, a management number of field, and the like. The field display portion 81 displays the field map MP2 showing a predetermined field corresponding to the field identification information input in the field input portion 80. That is, the route creating unit 105 requests, from the map storage 102, the field map MP2 corresponding to the field identification information input to the field input portion 80, and displays, on the field display portion 81, the field map MP2 transmitted from the map storage 102.

In the work setting screen M2, when a headland width W1 is input in the headland width input portion 82 and the headland setting button 83 is selected, the route creating unit 105 displays a work area A2, excluding a headland area A1, in the field map MP2 displayed in the field display portion 81. For example, the route creating unit 105 sets an area surrounded by a contour H2, which is formed by offsetting the contour H1 of the field map MP2 inward by the headland width W1, as the work area A2. In the work setting screen M2, the work area A2 may be set in the field map MP2 by designating, with a pointer or the like, a position of an outline of the work area A2 on the field map MP2 displayed in the field display portion 81.

Figure 7:
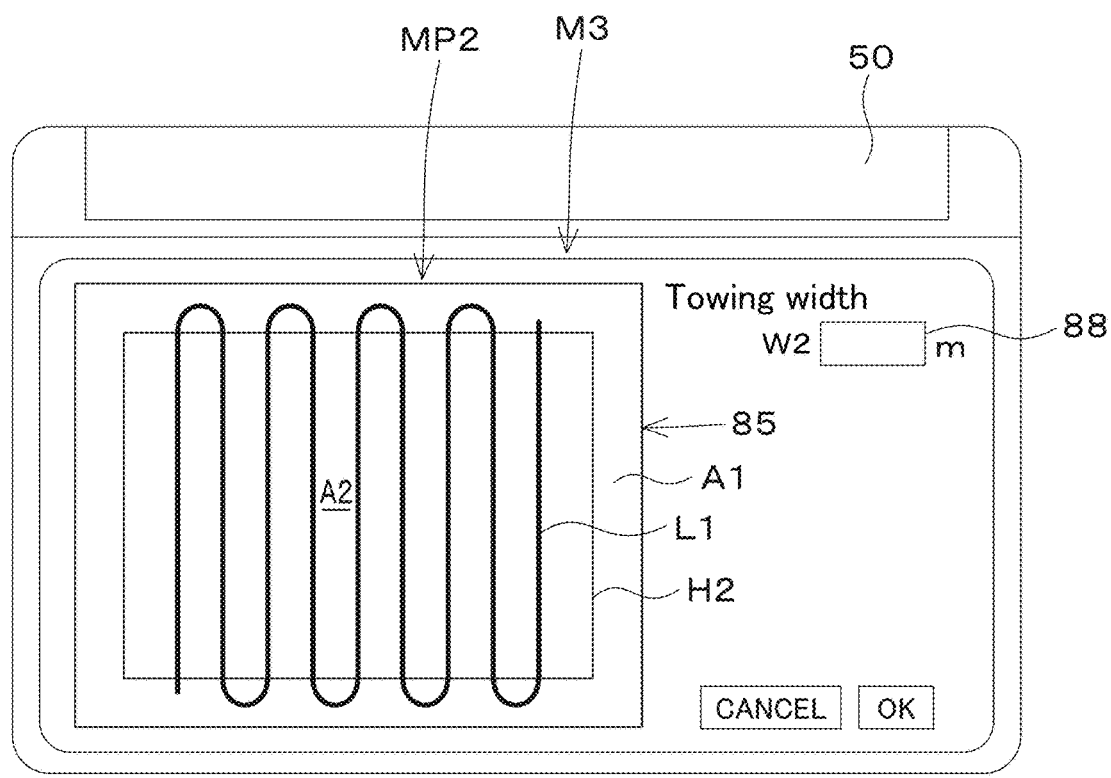
FIG. 7 is a view showing an example of a route setting screen M3.

As shown in FIG. 7, when the setting of the work area A2 is completed, the route creating unit 105 switches display of the display device (that is, the traveling support device 100) from the work setting screen M2 to a route setting screen M3. In the route setting screen M3, it is possible to set the scheduled traveling route L1 in an area including the work area A2 in a field. The route setting screen M3 includes a route display portion 85 that displays the scheduled travel route L1 and a width input portion 88. The width acquisition unit 107 acquires a towing width W2 input to the width input portion 88. The towing width W2 of the towed vehicle 2 is a width of the towed vehicle 2.

Figure 8A:
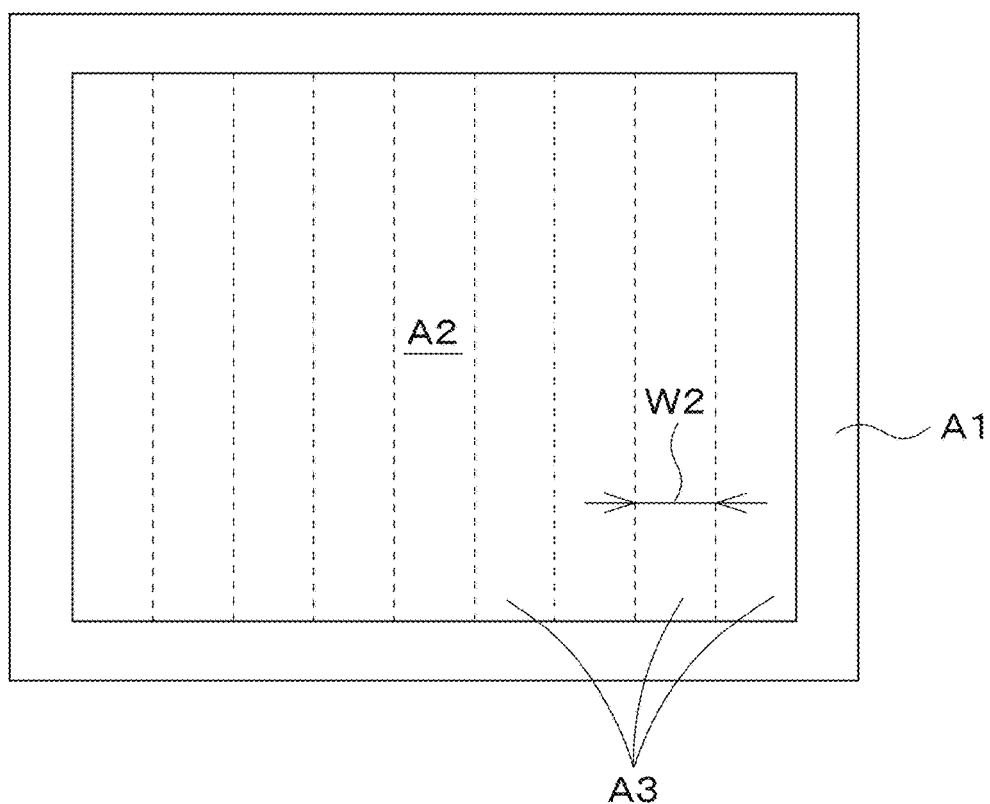
FIG. 8A is a view showing a unit work section A3 created in a work area A2.
Figure 8B:
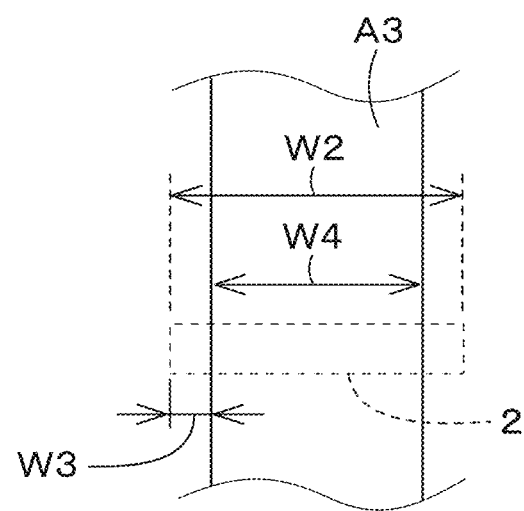
FIG. 8B is a view showing a unit work section A3 different from that of FIG. 8A.

When the width acquisition unit 107 acquires the towing width W2, the route creating unit 105 creates, in the work area A2, a plurality of unit work sections A3 in which the towed vehicle 2 works by dividing the work area A2 vertically or horizontally by the towing width W2, as shown in FIG. 8A. That is, the route creating unit 105 creates a plurality of unit work sections A3 of the same width as the towing width W2 in the work area A2. As shown in FIG. 8B, the route creating unit 105 may create a plurality of unit work sections A3 each having a width W4, which is a width obtained by eliminating an overlap width W3 from the towing width W2, in the work area A2. The overlap width W3 can be input in the route setting screen M3. That is, the route creating unit 105 sets, as the unit work area A3, the minimum unit area in which a work is performed on the field by the towed vehicle 2 when the traveling vehicle 3 connected to the towed vehicle 2 travels.

Figure 9:
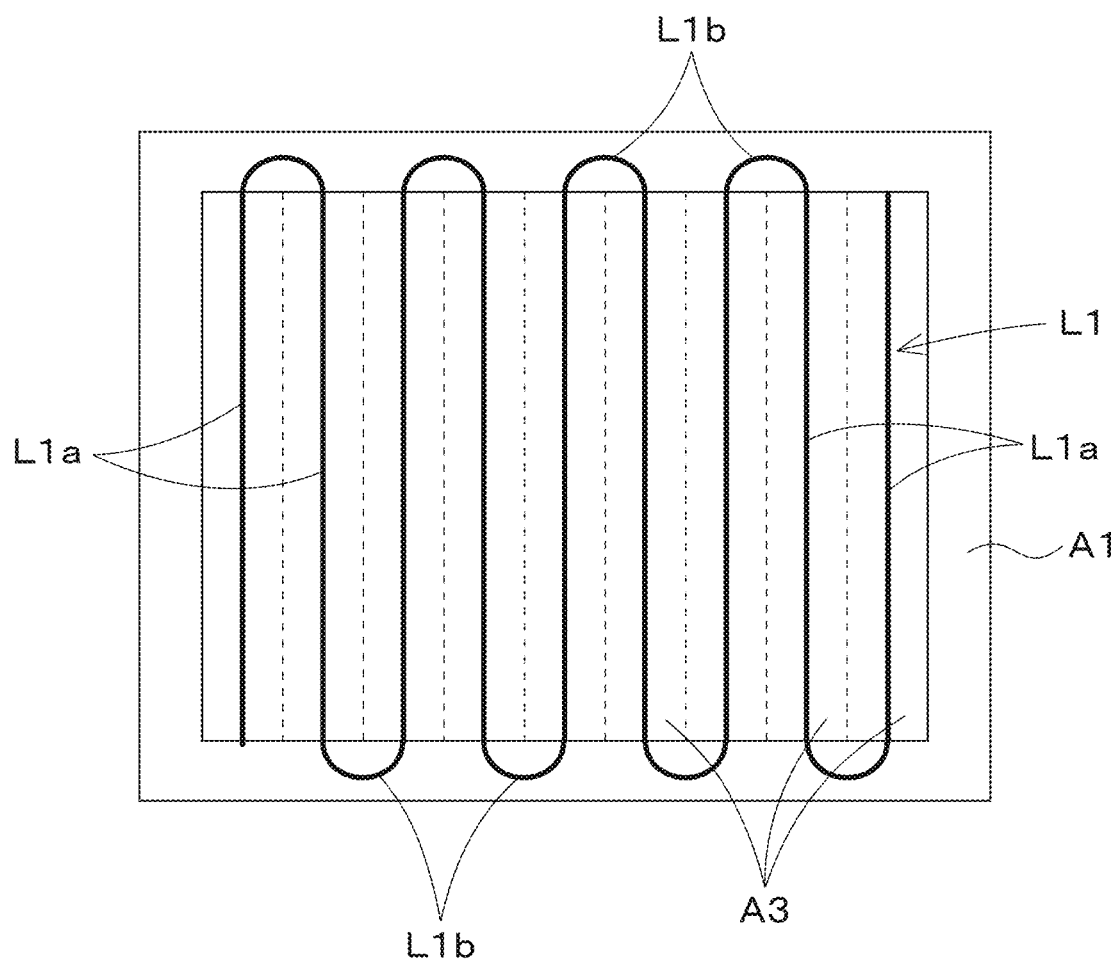
FIG. 9 is an explanation view explaining creation of a scheduled traveling route.

The route creating unit 105 includes a straight-line creating part 105A and a turn creating part 105B. As shown in FIG. 9, the straight-line creating part 105A creates, for each unit work section A3 in the work area A2, a straight-line portion (that is, a straight-line route) L1a configured to make the traveling vehicle 3 moving thereon travel straight. That is, the straight-line creating part 105A creates, for example, a straight-line portion L1a at a width directional center of the unit work section A3, the straight-line portion L1a connecting both longitudinal directional ends of the unit work section A3 to each other. In addition, the turn creating part 105B creates a turn portion (that is, a turn route) L1b by connecting adjoining straight-line portions L1a to each other, the turn portion L1b being configured to make the traveling vehicle 3 moving thereon turn.

Figure 10A:
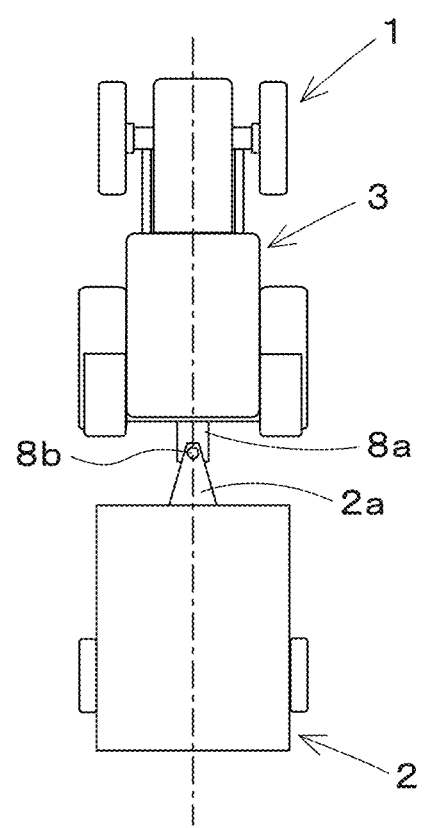
FIG. 10A is a view that shows traveling in a state where an extension member and a connecting bar are aligned in a straight line in a fore-and-aft direction.
Figure 10B:
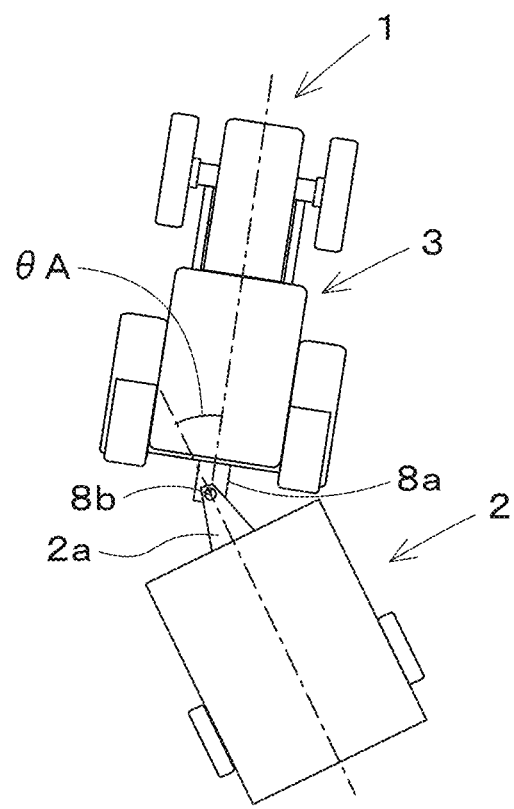
FIG. 10B is a view that shows traveling in a state where the connecting bar is oblique relative to the extension member.

The autonomous traveling controller 61 controls autonomous traveling based on a relative angle θA between the connector 8 of the traveling vehicle 3 and the towed vehicle 2 connected to the connector 8. The working machine includes an angle detector 90 configured to detect the relative angle θA with light, magnetism, or the like. The angle detector 90 includes a magnet (or magnets) attached to a swingable portion (that is, a front end of the connecting bar 2a of the towed vehicle 2) and a magnetic sensor attached to a stationary portion (that is, the upper wall 8a1 or lower wall 8a2 of the extension 8a). In the angle detector 90, the relative angle θA is detected by sensing a change in magnetic field of the magnet with the magnetic sensor. As shown in FIG. 10A, when the connecting bar 2a and the extension member 8a are aligned in a straight line in a fore-and-aft direction, the angle detector 90 detects that the relative angle θA is zero. As shown in FIG. 10B, when the extension member 8a crosses (bends) with respect to the connecting bar 2a, the angle detector 90 detects the relative angle θA according to a crossing degree. The above-mentioned angle detector 90 is just an example and is not limited thereto, and may include an infrared sensor, a rotary encoder, a device to capture an image and detects an angle from the captured image, a device to detect an angle based on extending and contracting of a cylinder or the like, or any other configuration.

The automatic traveling controller 61 determines at least one of the steering angle and the steering direction based on the relative angle θA. For example, in a state where autonomous traveling is being performed on the straight-line portion L1a and the turn portion L1b, when the relative angle θA is larger than a predetermined judgment value and a distance between the traveling vehicle 3 and the towed vehicle 2 defined by the connector 8 is short, the autonomous traveling controller 61 reduces the relative angle θA by setting a steering angle of the steering device 11 to be smaller than the current steering angle, and reduces the relative angle θA by changing a steering direction to a direction in which the traveling vehicle 3 and the towed vehicle 2 are separated further away from each other.

Figure 11A:
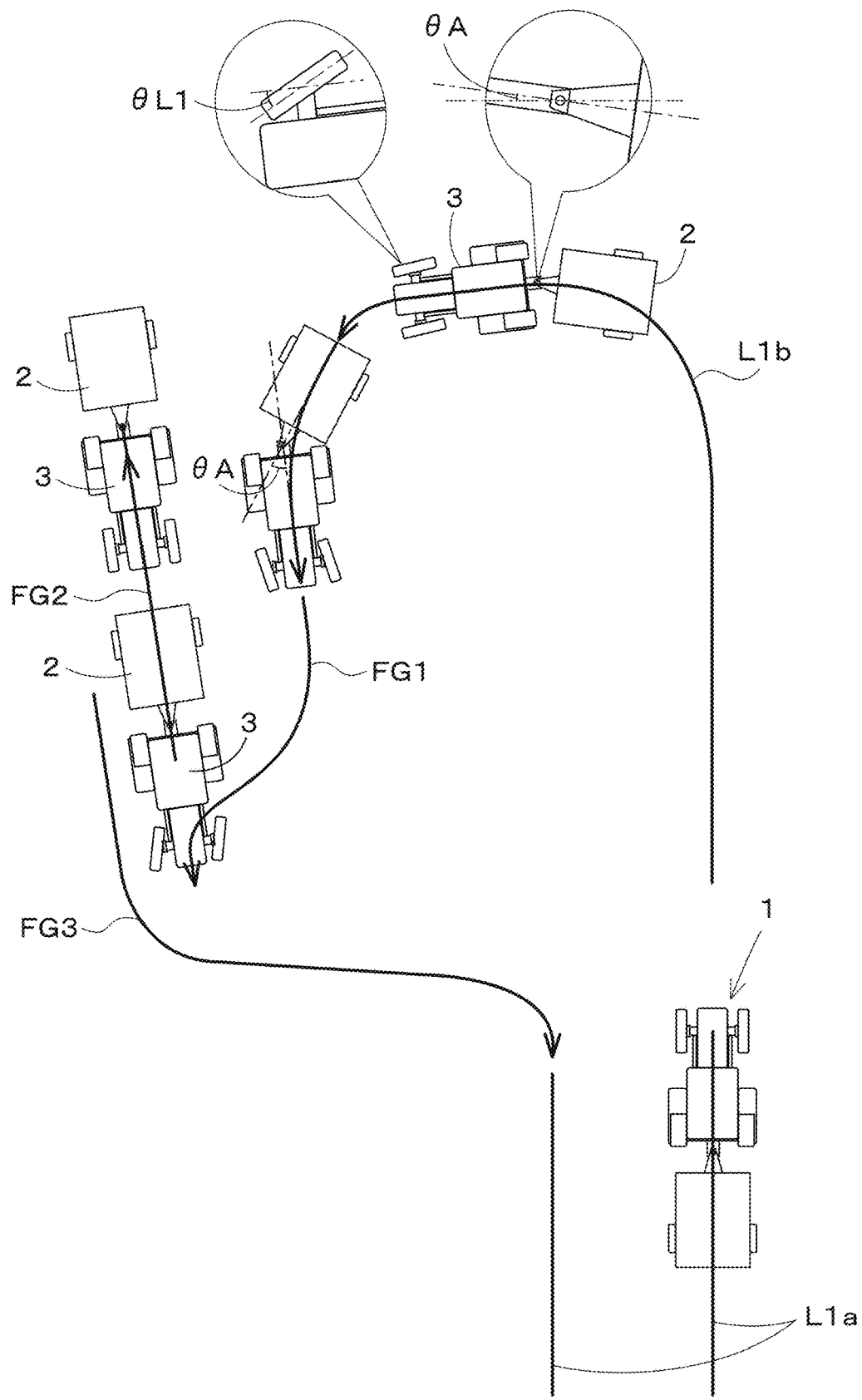
FIG. 11A is a view showing states of a working machine turning left and turning in multi-point.
Figure 11B:
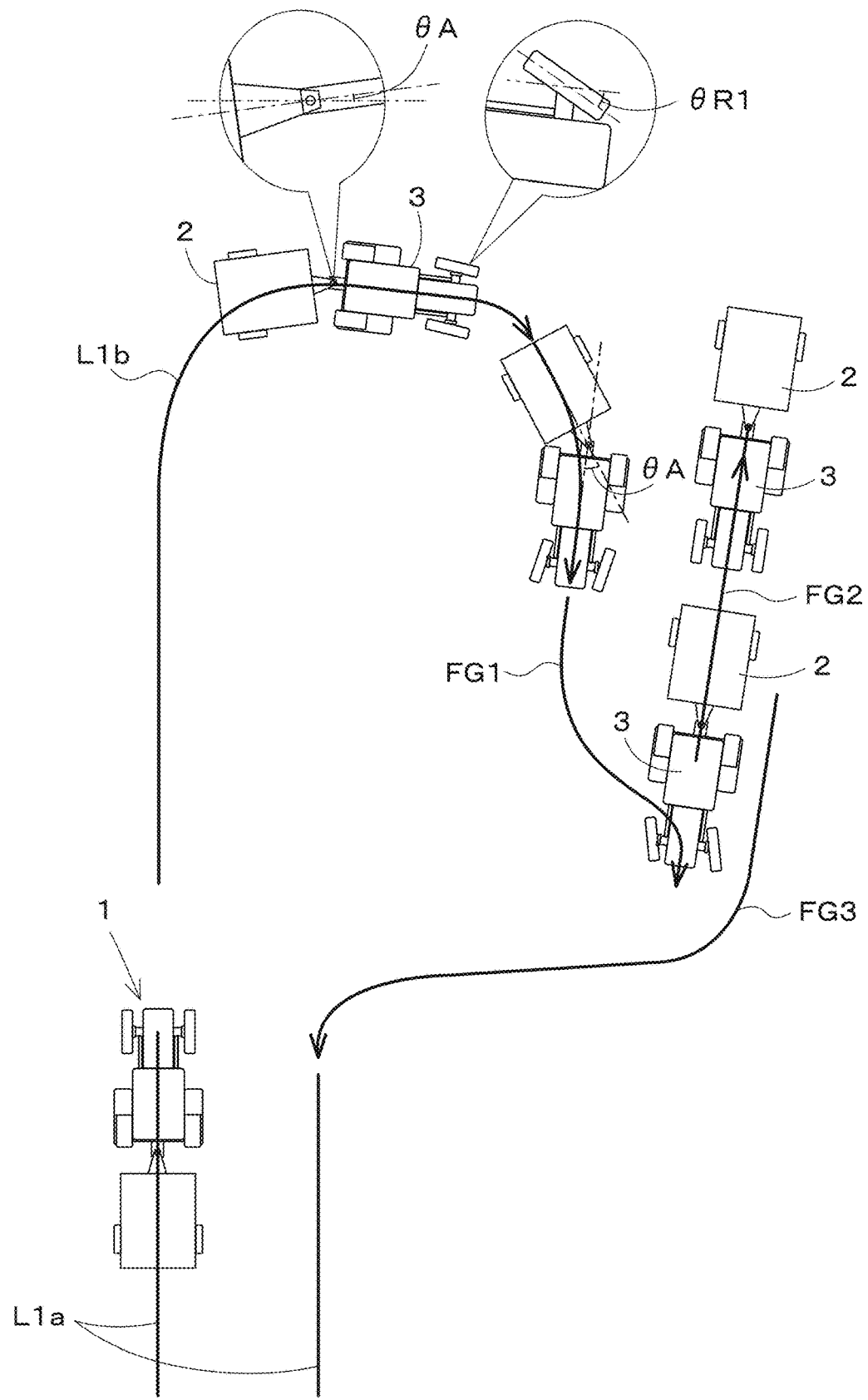
FIG. 11B is a view showing states of the working machine turning right and turning in multi-point.

FIGS. 11A and 11B show a state where the traveling vehicle 3 and the towed vehicle 2 are turning in the headland area A1.

As shown in FIGS. 11A and 11B, the autonomous traveling controller 61 monitors the relative angle θA when the traveling vehicle 3 turns while traveling forward on the turn area L1b. When the relative angle θA detected by the angle detector 90 is less than a turn judgment value θT, the autonomous traveling controller 61 determines steering angles θL1 and θR1 based on the turn portion L1b and the vehicle position to execute a turn control so that the vehicle position of the traveling vehicle 3 matches the turn portion L1b. That is, when the relative angle θA is less than the turn judgment value θT, the autonomous traveling controller 61 continues the turn control in which the turning is performed according to the steering angles θL1 and θR1 determined based on the turn portion L1b and the vehicle position.

On the other hand, in a state when the traveling vehicle 3 turns while traveling forward on the turn portion L1b, the autonomous traveling controller 61 stops the turn control when the relative angle θA is the turn judgment value θT or more. In a state where the steering device 11 turns the traveling vehicle 3 to the right, the autonomous traveling controller 61 also stops the turn control when the relative angle θA is the turn judgment value θT or more.

When the autonomous traveling controller 61 stops the turn control, the control shifts to a multi-point turn control. In the multi-point turn control, the traveling vehicle 3 switchbacks the steering in multi-point by changing the steering angles θL1 and θR1 so that the traveling vehicle 3 can enter on the straight-line portion L1a continuously connecting to the turn portion L1b.

As shown in FIG. 11A, in a state where the steering device 11 turns the traveling vehicle 3 to the left, the autonomous traveling controller 61 shifts from the turn control to the multi-point turn control when the relative angle θA is the turn judgment value θT or more at a point P60. In the multi-point turn control, the steering direction is changed from the left to the right by the steering device 11 as shown by a switchback FG1, and the traveling vehicle 3 travels forward. In the switchback FG1, the forward-traveling is performed with the steering direction changed from the left to the right, and thus the relative angle θA gradually decreases. When the traveling vehicle 3 and the towed vehicle 2 are in a straight line, that is, when the relative angle θA becomes zero, the steering angle θL1 of the steering device 11 is set to be substantially zero, and the traveling vehicle 3 travels backward, as shown in a switchback FG2.

In the switchback FG2, the traveling vehicle 3 and the towed vehicle 2 will move in the same direction without being bent.

After the traveling vehicle 3 and the towed vehicle 2 travel backward in an integral manner, the traveling vehicle 3 travels forward as shown by a switchback FG3, and then the traveling vehicle 3 enters the straight-line portion L1a. When the traveling vehicle 3 enters the straight-line portion L1a, the autonomous traveling controller 61 terminates the multi-point turn control and shifts to a straight-traveling control.

Figure 12A:
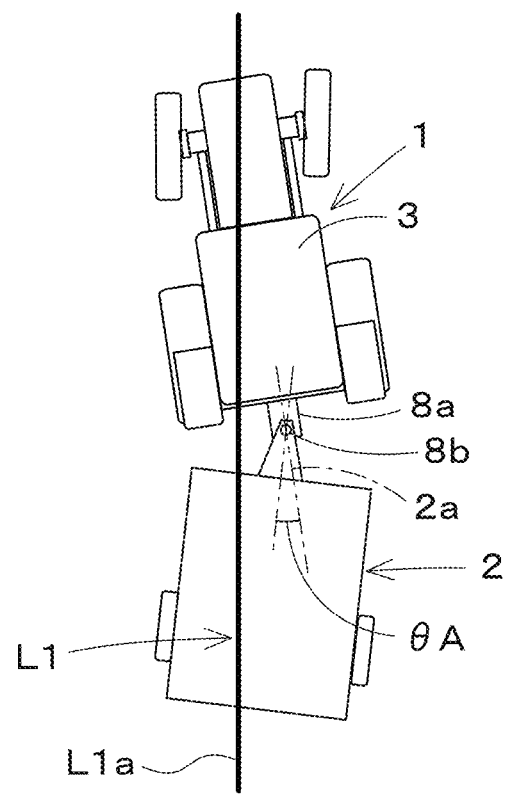
FIG. 12A is a view showing a state where a traveling vehicle and a towed vehicle travel straight with a configuration oblique in one direction.

In the straight-traveling control, the autonomous traveling controller 61 sets a steering angle of the steering device 11 so that the traveling vehicle 3 and the towed vehicle 2 are positioned on the straight-line portion L1a, that is, so that the traveling vehicle 3 and the towed vehicle 2 travels straight while the relative angle θA is maintained at zero. As shown in FIG. 12A, when the pivot pin 8b is positioned on one side (rightward) relative to the straight-line portion L1a and the traveling vehicle 3 and towed vehicle 2 are orientated oblique each other in an inverted L-shape, the straight-traveling control sets the steering direction of the traveling vehicle 3 to the one side (rightward) to decrease the relative angle θA so that the traveling vehicle 3 and the towed vehicle 2 are steered to travel on the straight-line portion L1a.

Figure 12B:
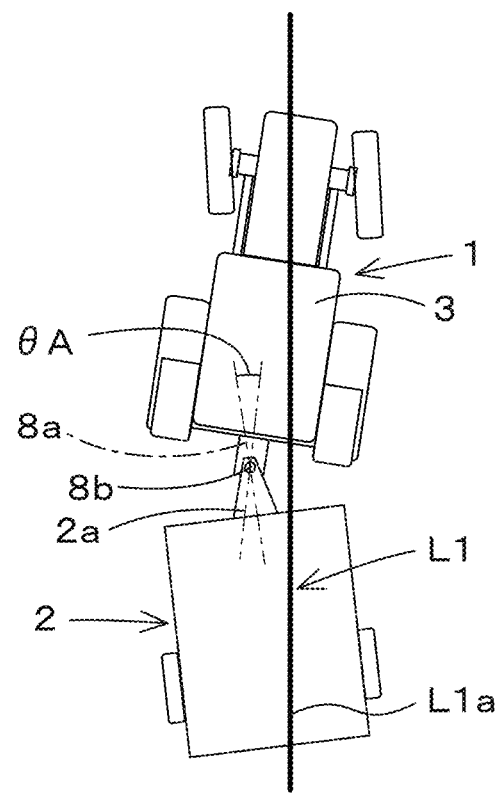
FIG. 12B is a view showing a state where the traveling vehicle and the towed vehicle travel straight with a configuration oblique in the other direction.

As shown in FIG. 12B, when the pivot pin 8b is positioned on the other side (leftward) relative to the straight-line portion L1a and the traveling vehicle 3 and towed vehicle 2 are orientated oblique each other in an L-shape, the straight-traveling control sets the steering direction of the traveling vehicle 3 to the other side (leftward) to decrease the relative angle θA so that the traveling vehicle 3 and the towed vehicle 2 are steered to travel on the straight-line portion L1a. As shown in FIGS. 12A and 12B, when the traveling vehicle 3 and the towed vehicle 2 are orientated oblique each other in an inverted L-shape in the straight-traveling control, a steering angle of the steering device 11 may be set based on a magnitude of the relative angle θA or based on a deviation between the straight-line portion L1a and the vehicle position.

Thus, since a steering angle and steering direction are controlled based on the relative angle θA, a traveling straightness of the vehicle on the straight-line portion L1a can be improved.

Figure 13:
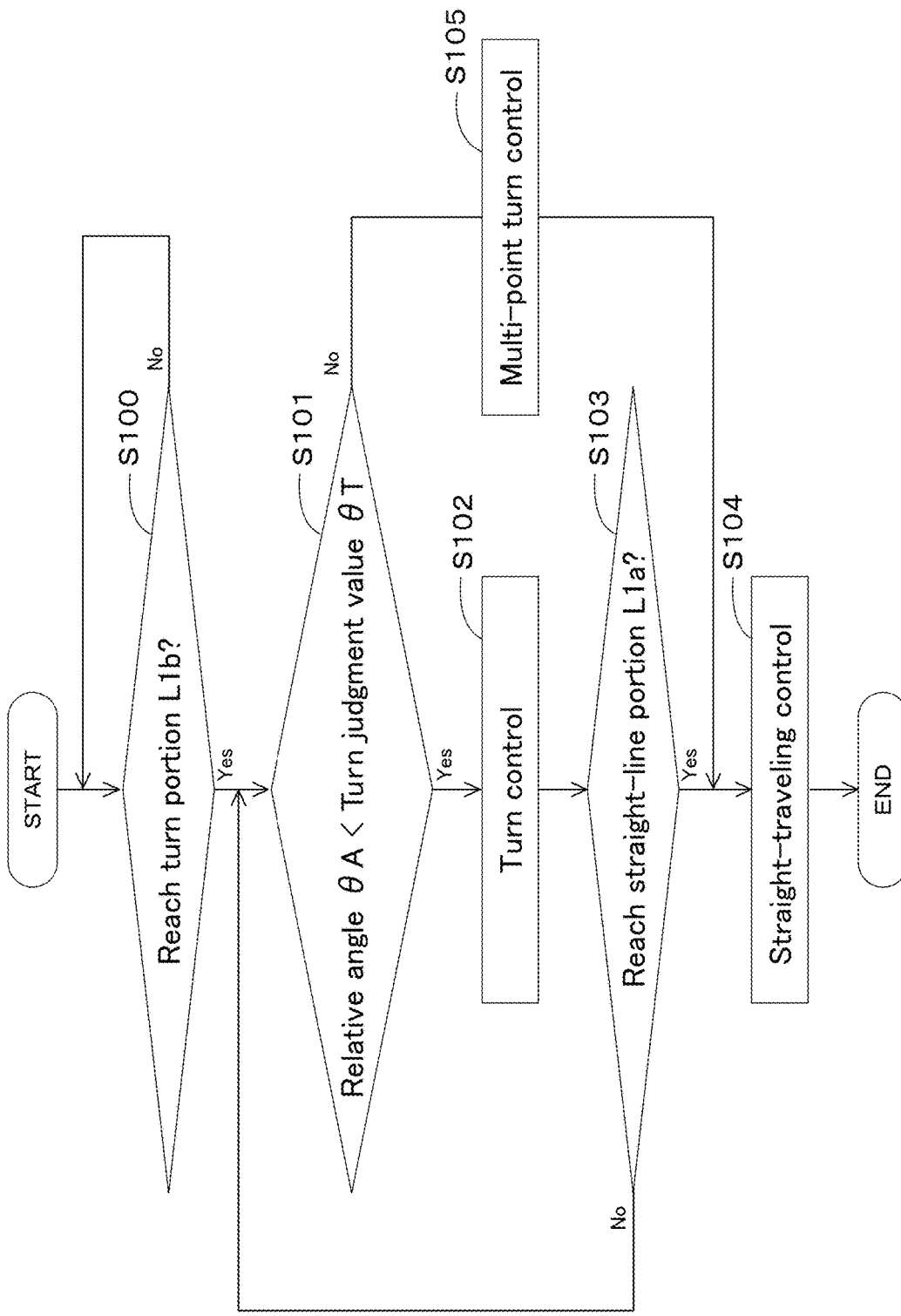
FIG. 13 is a view showing a flow of the autonomous traveling.

FIG. 13 is a view showing autonomous traveling in the autonomous traveling controller 61. As shown in FIG. 13, in performing autonomous traveling, the autonomous traveling controller 61 judges whether a vehicle position of the traveling vehicle 3 has reached the turn portion L1b from the straight-line portion L1a (S100). When the vehicle position of the traveling vehicle 3 has reached the turn portion L1b (S100, Yes), the autonomous traveling controller 61 judges whether the relative angle θA is less than the turn judgment value θT (S101). When the relative angle θA is less than the turn judgment value θT (S101, Yes), the autonomous traveling controller 61 executes the turn control (S102). It is judged whether or not the vehicle position of the traveling vehicle 3 has reached the straight-line portion Lia from the turn portion Lib (S103). When the vehicle position of the traveling vehicle 3 has not reached the straight-line portion Lia from the turn portion Lib (S103, No), the autonomous traveling controller 61 returns to S101. On the other hand, when the vehicle position of the traveling vehicle 3 has reached the straight-line portion L1a from the turn portion L1b (S103, Yes), the autonomous traveling controller 61 shifts to straight-traveling control (S104). When the relative angle θA is the turn judgment value θT or more (S101, No), the autonomous traveling controller 61 stops the turn control and shifts to the multi-point turn control (S105), and when the multi-point turn control ends, the autonomous traveling controller 61 shifts to the straight-traveling control (S104). The autonomous traveling controller 61 controls the steering angle and steering direction so that the traveling vehicle 3 and the towed vehicle 2 positionally match the straight-line portion L1a and the relative angle θA is zero in the straight-traveling control.

According to the working vehicle and the working machine described above, since the autonomous traveling is controlled based on the relative angle θA between the traveling vehicle 3 and the towed vehicle 2, the autonomous traveling can be easily performed even when the traveling vehicle 3 and the towed vehicle 2 connected to the traveling vehicle 3 are autonomously traveling on the scheduled traveling route L1. For example, contact between the traveling vehicle 3 and the towed vehicle 2 (that is, vehicle contact) or jackknife phenomenon can be prevented by knowing the relative angle θA during autonomous traveling and controlling at least one of the steering angle and steering direction according to the relative angle θA.

When the traveling vehicle 3 is traveling on the straight-line portion Lia, the traveling vehicle 3 and the towed vehicle 2 can travel so that the positions of both the traveling vehicle 3 and the towed vehicle 2 match the straight-line portion Lia, thus improving the traveling straightness.

In addition, when the traveling vehicle 3 turns left or right on the turn portion Lib, the vehicle contact and the jackknife phenomena can be prevented. In addition, when the relative angle θA between the traveling vehicle 3 and the towed vehicle 2 is large and the turning is difficult, the control can automatically shift from the turn control to the multi-point turn control, and thus the traveling vehicle 3 can return smoothly to the straight-line portion Lia through the turning in multi-point.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a traveling vehicle to travel on a scheduled traveling route and including a connector to which a towed vehicle is connected, the connector being provided on a rear portion of the traveling vehicle; and
   an autonomous traveling controller configured or programmed to control autonomous traveling of the traveling vehicle based on the scheduled traveling route and a relative angle between the connector of the traveling vehicle and the towed vehicle connected to the connector; wherein
   the autonomous traveling controller is configured or programmed such that:
      when the traveling vehicle travels forward with the towed vehicle towed thereby and turns along a turn portion included in the scheduled traveling route, when the relative angle is less than a turn judgment value, the autonomous traveling controller performs a turn control in which the autonomous traveling controller determines at least one of a steering angle or a steering direction of the traveling vehicle so that a vehicle position of the traveling vehicle matches the turn portion and controls steering of the traveling vehicle based on the determined at least one of the steering angle or the steering direction, and when the relative angle becomes the turn judgment value or more in the turn control, the autonomous traveling controller stops the turn control; and after the autonomous traveling controller stops the turn control when the relative angle becomes the turn judgment value or more in the turn control, the autonomous traveling controller performs a multi-point turn control in which the autonomous traveling controller changes at least one of the steering angle or the steering direction so that the traveling vehicle enters a straight-line portion included in the scheduled traveling route and continuing from the turn portion, and controls the steering of the traveling vehicle based on the changed at least one of the steering angle or the steering direction while causing the traveling vehicle to travel forward and backward.

2. The working vehicle according to claim 1, further comprising:

an angle detector to detect the relative angle; and a positioning device to detect the vehicle position; wherein the autonomous traveling controller is configured or programmed to, based on the relative angle, the vehicle position, and the scheduled traveling route, control steering of the traveling vehicle so that the vehicle position of the traveling vehicle matches the scheduled traveling route.

3. The working vehicle according to claim 2, wherein the autonomous traveling controller is configured or programmed to determine at least one of the steering angle or the steering direction based on the relative angle, and control the steering of the traveling vehicle based on the determined at least one of the steering angle or the steering direction.

4. The working vehicle according to claim 1, wherein the autonomous traveling controller is configured or programmed to, when the traveling vehicle travels forward with the towed vehicle towed thereby along the straight-line portion after the turn control is terminated or the multi-point turn control is terminated, perform a straight-traveling control in which the autonomous traveling controller determines at least one of the steering angle or the steering direction and control the steering of the traveling vehicle based on the determined at least one of the steering angle or the steering direction so that the traveling vehicle and the towed vehicle are positioned on the straight-line portion.

5. A working machine comprising:

the working vehicle according to claim 1;

a towed vehicle connected to the working vehicle; and an angle detector to detect the relative angle.

6. The working vehicle according to claim 1, wherein the autonomous traveling controller is configured or programmed to, in the multi-point turn control, change the steering direction and cause the traveling vehicle to travel forward to reduce the relative angle, and, when the relative angle reaches zero, set the steering angle to zero and cause the traveling vehicle to travel rearward and then enter the straight-line portion continuing from the turn portion.

7. The working vehicle according to claim 4, wherein the autonomous traveling controller is configured to, in the straight-traveling control, when the relative angle is not zero, determine at least one of the steering angle or the steering direction based on at least one of the relative angle or a deviation of the vehicle position from the straight-line portion.

* * * * *